US012555956B2

(12) United States Patent
Lee

(10) Patent No.: US 12,555,956 B2
(45) Date of Patent: Feb. 17, 2026

(54) ELECTRICAL CONNECTOR

(71) Applicant: HIROSE KOREA CO., LTD., Siheung-si (KR)

(72) Inventor: Yong Jin Lee, Siheung-si (KR)

(73) Assignee: HIROSE KOREA CO., LTD., Siheung-si (KR)

( * ) Notice: Subject to any disclaimer, the term of this patent is extended or adjusted under 35 U.S.C. 154(b) by 282 days.

(21) Appl. No.: 18/239,360

(22) Filed: Aug. 29, 2023

(65) Prior Publication Data

US 2024/0072491 A1 Feb. 29, 2024

(30) Foreign Application Priority Data

Aug. 29, 2022 (KR) ........................ 10-2022-0108209

(51) Int. Cl.
*H01R 13/639* (2006.01)
*H01R 13/506* (2006.01)

(52) U.S. Cl.
CPC ......... *H01R 13/639* (2013.01); *H01R 13/506* (2013.01)

(58) Field of Classification Search
None
See application file for complete search history.

(56) References Cited

U.S. PATENT DOCUMENTS

2011/0028040 A1* 2/2011 Wu ........................ H01R 12/57
439/626

FOREIGN PATENT DOCUMENTS

KR 20200031872 A * 3/2020 .......... H04M 1/0274

* cited by examiner

*Primary Examiner* — Tho D Ta
(74) *Attorney, Agent, or Firm* — Maschoff Brennan

(57) ABSTRACT

Disclosed herein is an electrical connector including a plug connector mounted on a substrate and connected to a receptacle connector. The plug connector includes: a plug housing including a base and first to fourth walls; and multiple plug signal terminals disposed at least on the first wall. A recess is formed between the plug signal terminals to be located below an upper end of the first wall of the plug housing. In the receptacle connector as a mating connector, a protrusion is formed between receptacle signal terminals 20-3 to be located above a base of a receptacle housing of the receptacle connector. The recess of the plug connector (10) receives the protrusion of the receptacle connector therein.

7 Claims, 7 Drawing Sheets

ELECTRICAL CONNECTOR

TECHNICAL FIELD

The present invention relates to an electrical connector. More particularly, the present invention relates to a connection structure between a plug connector and a receptacle connector.

BACKGROUND

Generally, interconnection between substrates is established using two connectors that are connected to respective substrates by soldering or the like and are connectable to each other. Here, one of the two connectors is a plug connector and the other is a socket connector. The socket connector is also referred to as a receptacle connector. Such plug and socket connectors may be formed by disposing terminals in a molded part. The plug connector and the socket connector may be fastened to each other to form an electrical connector assembly.

With the trend toward miniaturization of electronic devices, connectors have increasingly become compact in size and height. However, there are certain limitations in making a connector compact in size and height by reducing a pitch between electrical terminals or by downsizing related components.

Miniaturization of connectors makes it more difficult than before to ensure durability thereof. Such connectors are more prone to breakage or deformation under a smaller force due to reduced rigidity thereof.

For example, two mating connectors can undergo plastic deformation if metal terminals thereof continue to retain a certain shape during or after the process of connecting the connectors to each other. Plastic deformation is the opposite of elastic deformation and refers to irreversible deformation or changes in shape of a material that is retained after removal of applied load. Most materials can usually undergo deformation upon stress application, despite having elasticity. Therefore, there is a need for a solution to prevent plastic deformation that can occur in connector terminals, which are becoming increasingly reduced in size.

A resin-molded part (housing) of a connector is often manufactured by insert molding. Here, fluidity of a resin used is critical to proper molding of the housing. Therefore, there is a need to improve fluidity of the resin.

In addition, in manufacture of metal terminals, the structures of the terminals and the resin-molded part are limited depending on the manufacturing method thereof (for example, whether deep drawing is used). Therefore, there is a need to consider these points.

Further, during an insert molding process or the like, an injected resin can cover a metal material. Therefore, there is a need to consider this problem.

SUMMARY

It is one aspect of the present invention to solve a problem of reduction in strength of a molded part of a connector which becomes thinner through reduction in size and height thereof.

It is another aspect of the present invention to provide a solution to reinforce a housing (molded part) at several locations thereof where the housing (molded part) has a reduced thickness.

The above and other aspects of the present invention will become apparent to those skilled in the art from the detailed description of the following embodiments in conjunction with the accompanying drawings.

In accordance with one aspect of the present invention, there is provided an electrical connector including a plug connector mounted on a substrate and connected to a receptacle connector, wherein the plug connector includes: a plug housing including a base, a first wall protruding from an upper surface of the base, a second wall protruding from the upper surface of the base and crossing the first wall, a third wall protruding from the upper surface of the base, crossing the second wall, and facing the first wall, and a fourth wall protruding from the upper surface of the base, crossing the first wall and the third wall, and facing the second wall; and multiple plug signal terminals disposed at least on the first wall, wherein a recess is formed between the plug signal terminals to be located below an upper end of the first wall of the plug housing.

The electrical connector may further include the receptacle connector, wherein the receptacle connector includes: a receptacle housing including a base, a first wall protruding from an upper surface of the base, a second wall protruding from the upper surface of the base and crossing the first wall, a third wall protruding from the upper surface of the base, crossing the second wall, and facing the first wall, a fourth wall protruding from the upper surface of the base, crossing the first wall and the third wall, and facing the second wall, and a central island portion protruding the upper surface of the base and surrounded by the first to fourth walls; and multiple receptacle signal terminals disposed at least on the first wall, wherein a protrusion is formed between the receptacle signal terminals to be located above the base of the receptacle housing.

The receptacle connector may further include an extension portion extending from the central island portion at least toward the first wall of the receptacle housing, wherein the extension portion is formed between the multiple receptacle signal terminals arranged along the first wall of the receptacle housing.

In the receptacle connector, an upper surface of the extension portion may be located above an upper surface of the central island portion.

The plug connector may further includes a lead-in portion protruding from the upper surface of the base of the plug housing and surrounded by the first to fourth walls of the plug housing, and, upon fitting of the plug connector into the receptacle connector, the lead-in portion of the plug connector is placed between multiple extension portions arranged along the first wall of the receptacle housing and multiple extension portions arranged along the third wall of the receptacle housing and partially overlaps the extension portions in a transverse direction of the receptacle connector.

In the receptacle connector, the extension portion may the same width as the protrusion.

The lead-in portion may be longer than a region in which the plug connectors are arranged, as measured in a longitudinal direction of the plug connector.

Embodiments of the present invention solve a problem of reduction in strength of a molded part of a connector which becomes thinner through reduction in size and height thereof.

Embodiments of the present invention provide a solution to reinforce a housing (molded part) at several locations thereof where the housing (molded part) has a reduced thickness.

The above and other advantageous effects of the present invention will become apparent to those skilled in the art from the detailed description of the following embodiments in conjunction with the accompanying drawings.

BRIEF DESCRIPTION OF THE DRAWINGS

The above and other aspects, features, and advantages of the present invention will become apparent from the detailed description of the following embodiments in conjunction with the accompanying drawings.

DETAILED DESCRIPTION OF EMBODIMENTS

Figure 1:
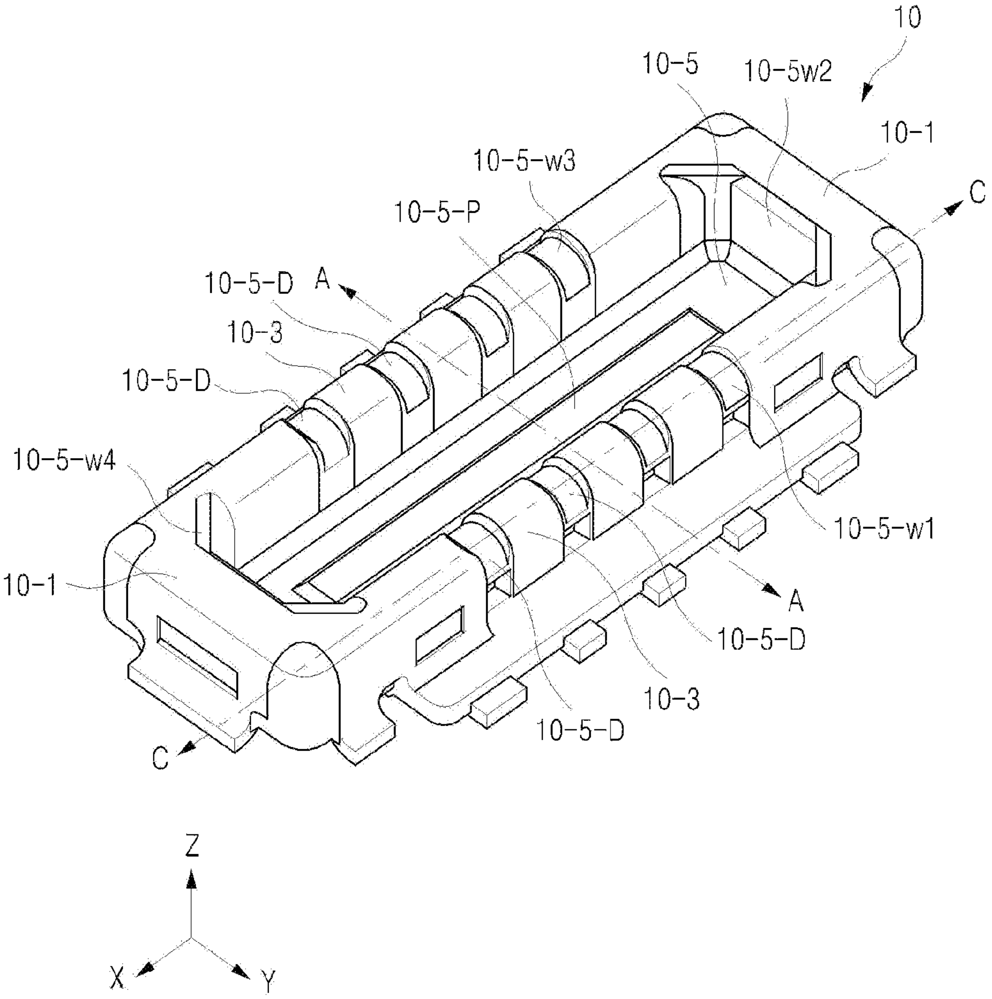
FIG. 1 is a view of a plug connector (10) among electrical connectors according to the present invention.

Hereinafter, exemplary embodiments of the present invention will be described with reference to the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims. Like components will be denoted by like reference numerals throughout the specification.

FIG. 1 is a view of a plug connector 10 among electrical connectors according to the present invention.

Herein, the term "electrical connector" may refer to a plug connector 10, a receptacle connector 20 (also referred to as a "socket connector"), or both the plug connector 10 and the receptacle connector 20 (or an assembly thereof), as the context indicates.

FIG. 1 shows, by way of example, a power terminal 10-1, a signal terminal 10-3, and a housing 10-5 (a molded part) of the plug connector 10.

The power terminal 10-1 is a metal structure for reinforcement of the connector 10 and allows input/output of electrical signals. The signal terminal 10-3 allows input/output of data signals.

However, this is merely an example and the present invention is not limited thereto. For example, the power terminal 10-1 may be formed with a fitting and a power terminal separate from each other.

For example, the signal terminal 10-3 may include four pins capable of carrying a current of 0.3 A, or may be a terminal capable of carrying a current of greater than 0.3 A, for example, a current of up to 5 A, to function as a power terminal. Although the signal terminal is described as including four pins, this is merely an example and the signal terminal 10-3 may include six signal terminals (see FIG. 1).

The housing 10-5 has a base. The housing 10-5 has a wall protruding from an upper surface of the base and adapted for the power terminal 10-1, the signal terminal 10-3, and the like to be formed thereon.

The wall includes four walls, that is, a first wall **10-5-*w*1, a second wall 10-5-*w*2, a third wall 10-5-*w*3, and a fourth wall 10-5-*w*4. As shown in FIG. 1, the four walls are connected to one another in a sequence of the first wall 10-5-*w*1/the second wall 10-5-*w*2/the third wall 10-5-*w*3/the fourth wall 10-5-*w*4 and the fourth wall 10-5-*w*4 is in turn connected to the first wall 10-5-*w*1**.

The housing 10-5 (a molded part) of the plug connector 10 may be formed of a plastic material, for example, a liquid crystal polymer (LCP). Alternatively, the housing 10-5 may be formed of an insulator, such as a resin and an epoxy, without being limited thereto. The power terminal 10-1 and the signal terminal 10-3 of the plug connector 10 may be formed of a metal, for example, copper or a copper alloy plated with gold (a nickel underlayer), without being limited thereto.

Figure 2:
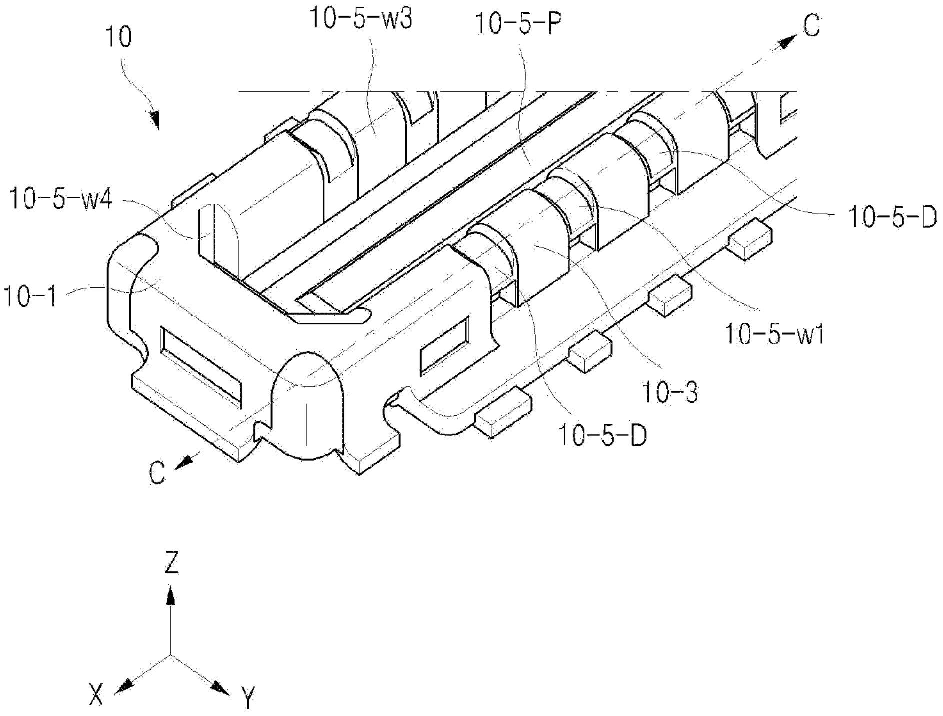
FIG. 2 is a partially enlarged view of the plug connector (10) of FIG. 1.

FIG. 2 is a partially enlarged view of the plug connector 10 of FIG. 1.

Multiple signal terminals 10-3 are disposed on the first wall **10-5-*w*1 extending in the X-axis direction (a longitudinal direction of the plug connector 10**).

Referring to FIG. 2, the signal terminal 10-3 and a portion of the housing 10-5 next thereto have a height difference therebetween rather than being flush with each other. That is, as shown in FIG. 2, a recess 10-5-D is formed on the first wall **10-5-*w*1 (a portion of the housing 10-5) between the power terminal 10-1 and a signal terminal 10-3 adjacent thereto. In addition, a recess 10-5-D is also formed on the first wall 10-5-*w*1 between each pair of adjacent signal terminals 10-3**.

It will be understood that the same structure may be applied to the third wall facing the first wall **10-5-*w*1**.

As will be described below with reference to FIG. 8 and the like, the recess 10-5-D is engaged with a protrusion 20-5-P of a mating connector, that is, a socket connector 20 (also referred to as a receptacle connector). Although the recess 10-5-D may be tightly secured to (for example, fitted into) the protrusion 20-5-P, the present invention is not limited thereto and the recess 10-5-D may be loosely secured to the protrusion 20-5-P to the degree that the protrusion 20-5-P is placed (received) in the recesses 10-5-D with a slight clearance therebetween.

In addition, referring to FIG. 1, a lead-in portion 10-5-P protrudes slightly upwards from the base at a center of the housing 10-5. The lead-in portion 10-5-P is surrounded by the first to fourth walls **10-5-*w*1 to 10-5-*w*4 of the plug housing 10-5**.

As described above, electrical connectors have become increasingly compact in height. Accordingly, the plug connector 10 of FIG. 1 may have a very small size, which inevitably leads to significant reduction in thickness of the base of the housing 10-5 and thus reduction in strength thereof. As a solution for this problem, the lead-in portion 10-5-P extends in the longitudinal direction of the plug connector 10 along a central region of the base (a region surrounded by the first to fourth walls and located at the center of the base in the transverse and longitudinal directions of the plug connector 10).

The presence of the lead-in portion 10-5-P results in increase in thickness of a corresponding portion of the housing 10-5 (especially, the base), thereby complementing rigidity of the housing 10-5 to a certain degree, that is, providing the effect of reinforcing the housing 10-5 with molded ribs, irrespective of reduction in height of the connector 10.

As shown in FIG. 1 and FIG. 2, the lead-in portion 10-5-P is longer than a plug signal terminal arrangement region, as measured in the longitudinal direction of the plug connector 10 (the X-axis direction). Here, the plug signal terminal arrangement region refers to a region of the first wall 10-5-*w*1 (in the longitudinal direction of the plug connector 10 (the X-axis direction)) on which three signal terminals 10-3 are arranged, as shown in FIG. 1.

Figure 3:
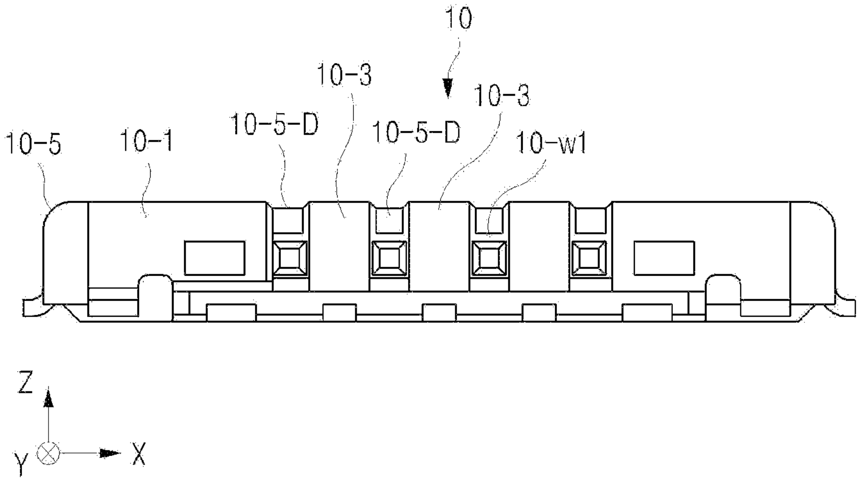
FIG. 3 is a side view of the plug connector (10) of FIG. 1 and FIG. 2.

FIG. 3 is a side view of the plug connector 10 of FIG. 1.

FIG. 3 shows a structure in which the power terminal 10-1 and the signal terminals 10-3 are coupled to the housing 10-5 (especially, the first wall 10-5-*w*1).

Referring to FIG. 3, a portion of the first wall 10-5-*w*1 (the housing 10-5) between the power terminal 10-1 and a signal terminal 10-3 adjacent thereto is formed with a recess 10-5-D stepped with respect to the power terminal 10-1 and a signal terminal 10-3. Similarly, a portion of the first wall 10-5-*w*1 between each pair of adjacent signal terminals 10-3 is formed with a recess 10-5-D.

Figure 4A:
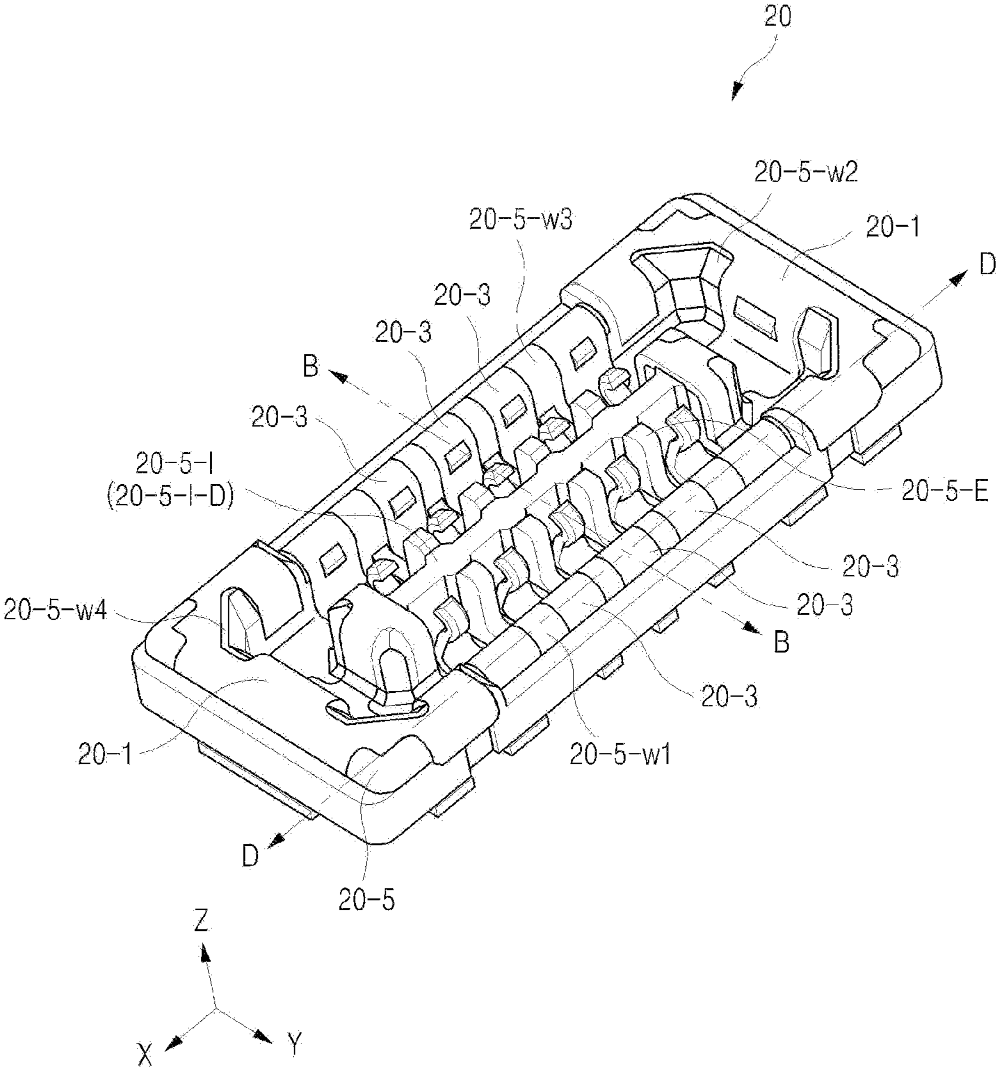
FIG. 4A is a view of a socket connector (20) among electrical connectors according to the present invention.

FIG. 4A is a view of a socket connector 20 among electrical connectors according to the present invention.

The socket connector 20 is also referred to as a receptacle connector 20.

The socket connector 20 of FIG. 4A and the plug connector 10 of FIG. 1 are configured to be fitted into each other. It will be understood that orientations (especially, vertical orientations) of FIG. 1 and FIG. 4A are for convenience of description of the structure of the connectors 10, 20, and the plug connector 10 and the socket connector 20 cannot be fitted into each other without changing the position of one of the two connectors 10, 20 shown in FIG. 1 or FIG. 4A. That is, the plug connector 10 of FIG. 1 needs to be turned upside down (such that the Z-axis direction is upside down) so as to be fitted into the socket connector 20 of FIG. 4A, and the socket connector 20 of FIG. 4A needs to be turned upside down (such that the Z-axis direction is upside down) so as to be fitted into the plug connector 10 of FIG. 1.

FIG. 4A shows, by way of example, a power terminal 20-1, a signal terminal 20-3, and a housing 20-5 (a molded part) of the socket connector 20.

The power terminal 20-1 is a metal structure for reinforcement of the connector 10 and allows input/output of electrical signals. The signal terminal 20-3 allows input/output of data signals.

However, this is merely an example and the present invention is not limited thereto. For example, the power terminal 20-1 may be formed with a fitting and a power terminal separate from each other.

For example, the signal terminal 20-3 may include four pins capable of carrying a current of 0.3 A, or may be a terminal capable of carrying a current of greater than 0.3 A, for example, a current of up to 5 A, to function as a power terminal. Although the signal terminal is described as including four pins, this is merely an example and the present invention is not limited thereto. For example, the signal terminal 20-3 may include six signal terminals (see FIG. 1).

The housing 20-5 has a base. The housing 20-5 has a wall protruding from an upper surface of the base and adapted for the power terminal 20-1, the signal terminal 20-3, and the like to be formed thereon. In addition, the housing 20-5 has an island portion 20-5-I (at a center thereof), in addition to the wall protruding from the base (at an edge thereof).

The wall includes four walls, that is, a first wall 20-5-*w*1, a second wall 20-5-*w*2, a third wall 20-5-*w*3, and a fourth wall 20-5-*w*4. As shown in FIG. 4A, the four walls are connected to one another in a sequence of the first wall 20-5-*w*1/the second wall 20-5-*w*2/the third wall 20-5-*w*3/the fourth wall 20-5-*w*4 and the fourth wall 20-5-*w*4 is in turn connected to the first wall 20-5-*w*1.

The housing 20-5 (a molded part) of the socket connector 20 may be formed of a plastic material, for example, a liquid crystal polymer (LCP). Alternatively, the housing 20-5 may be formed of an insulator, such as a resin and an epoxy, without being limited thereto. The power terminal 20-1 and the signal terminal 20-3 of the socket connector 20 may be formed of a metal, for example, copper or a copper alloy plated with gold (a nickel underlayer), without being limited thereto.

Figure 4B:
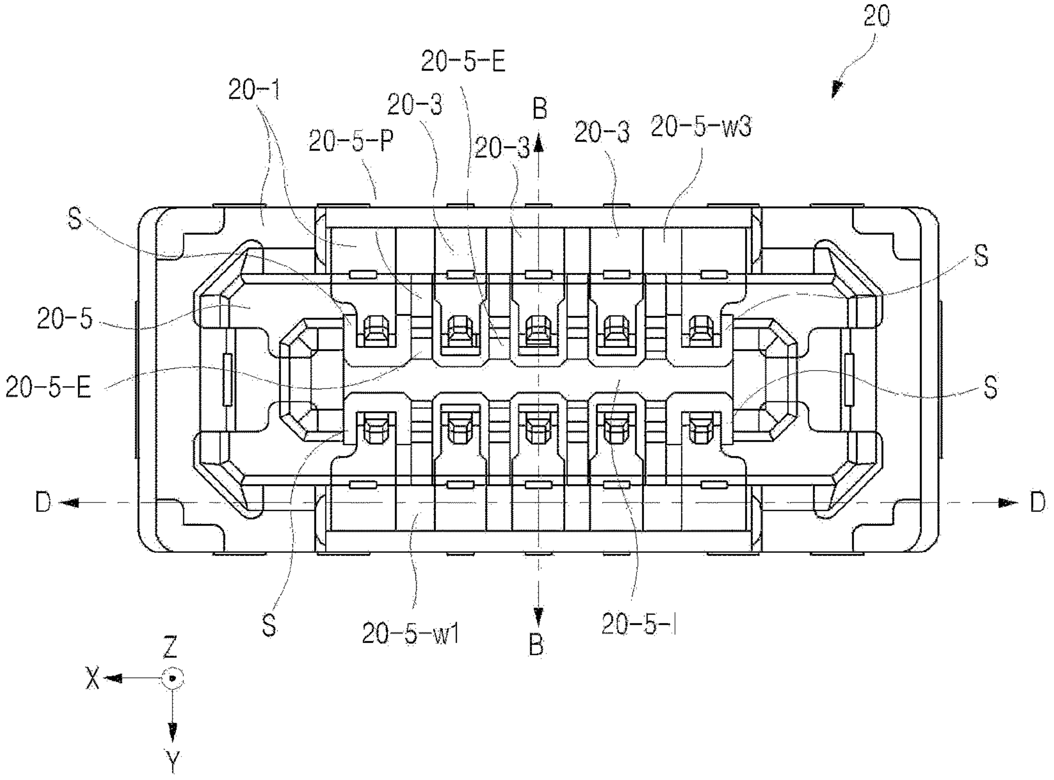
FIG. 4B is a view of the socket connector (20) of FIG. 4A from a different angle.

FIG. 4B is a view of the socket connector 20 of FIG. 4A from a different angle.

FIG. 4B also shows the power terminal 20-1, the signal terminal 20-3, and the housing 20-5 described in FIG. 4A.

For reference, there are three pairs of signal terminals 20-3 at the center of FIG. 4B and two power terminals 20-1 at the right and left ends of FIG. 4B, respectively. That is, one power terminal 20-1 is disposed at the right end of the socket connector 20 and the other power terminal 20-1 is disposed at the left end of the socket connector 20. Although the one power terminal 20-1 is shown as three pieces, the three pieces constituting the one power terminal 20-1 are actually connected to each other. Although the other power terminal 20-1 is shown as three pieces, the three pieces constituting the other power terminal 20-1 are actually connected to each other. The same structure may be applied to the power terminal 10-1 of the plug connector 10 (see FIG. 1) mated with the socket connector 20.

The housing 20-5 is formed at the center thereof with a central island portion 20-5-I protruding upwards (in the Z-axis direction) from the base of the housing 20-5. Between the central island portion 20-5-I and side walls (the first wall 20-5-*w*1 and the third wall 20-5-*w*3) of the housing 20-5 are an extension portion 20-5-E and a protrusion 20-5-P lined up in the transverse direction of the socket connector 20.

Figure 5:
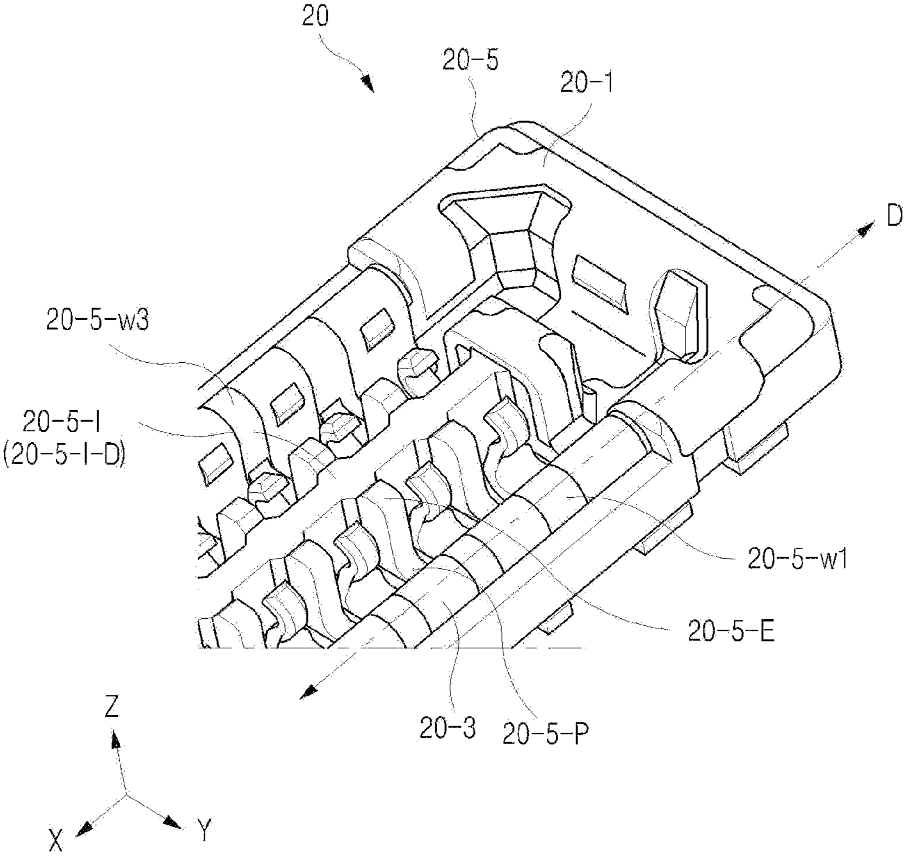
FIG. 5 is a partially enlarged view of the socket connector (20) of FIG. 4A.

While it is difficult to determine a relationship between heights of the base, the protrusion 20-5-P, the central island portion 20-54, and the extension portion 20-5-E of the housing 20-5 from FIG. 4B alone, comparison of the heights thereof in consideration of a relationship between FIG. 4A, FIG. 4B, and FIG. 5 shows that an upper surface of the base of the housing 20-5 is at the lowest position, an upper surface of the protrusion 20-5-P is located above an upper surface of the base, an upper surface of the central island portion 20-5-I is located above the upper surface of the protrusion 20-5-P, and an upper surface of the extension portion 20-5-E is located above the upper surface of the central island portion 20-5-I.

In FIG. 4B, reference numeral S indicates an empty space.

FIG. 5 is a partially enlarged view of the socket connector 20 of FIG. 4A.

Multiple signal terminals 20-3 are disposed on the first wall 20-5-*w*1 extending in the X-axis direction (the longitudinal direction of the socket connector 20).

The plug connector 10 of FIG. 2 has a stepped portion (the recess 10-5-D) on the first wall 20-5-*w*1, whereas the socket connector 20 of FIG. 4A has a stepped portion (the protrusion 20-5-P) at the base of the housing 20-5, rather than on the first wall 20-5-*w*1.

Figure 8:
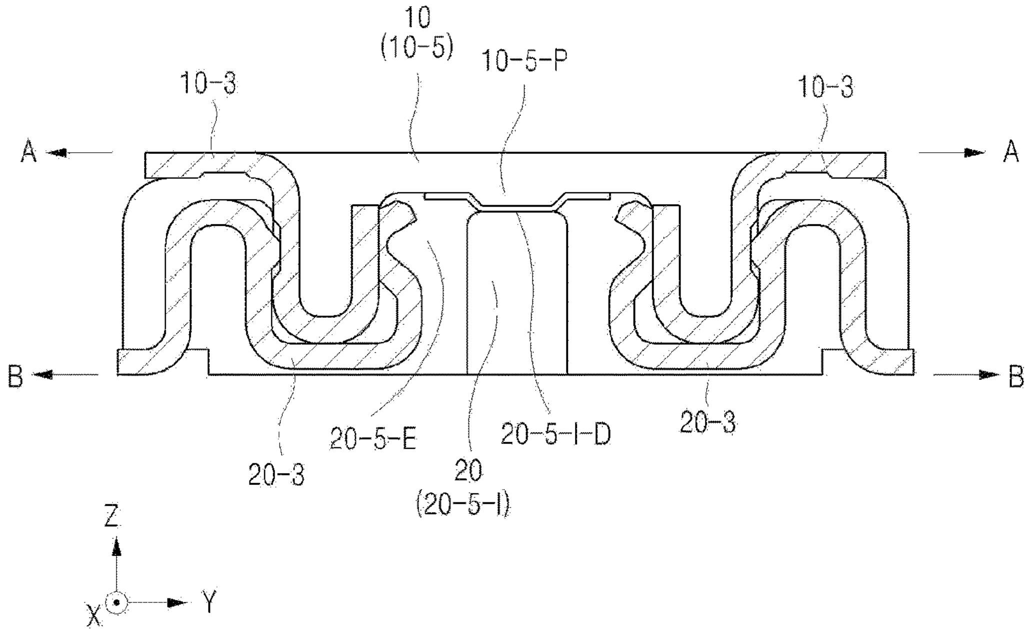
FIG. 8 is a sectional view obtained by combining section A-A of the plug connector (10) of FIG. 1 to FIG. 3 with section B-B of the socket connector 20 of FIG. 4A to FIG. 6, with the plug connector (10) connected to the socket connector (20)

This positional relationship serves to allow the protrusion 20-5-P to be received in the recess 10-5-D when the plug connector 10 of FIG. 2 and the socket connector 20 of FIG. 4A are connected to each other to form a connection structure as shown in FIG. 8.

Referring to FIG. 5, the protrusion 20-5-P protrudes upwards from the base of the housing 20-5 between each pair of adjacent signal terminals 20-3.

It will be understood that the same structure may be applied to the other side of the base with respect to the central island portion 20-5-I.

As will be described below with reference to FIG. 8, the protrusion 20-5-P is engaged with the recess 10-5-D of a mating connector, that is, the plug connector 10. Although the protrusion 20-5-P may be tightly secured to (for example, fitted into) the recess 10-5-D, the present invention is not limited thereto and the protrusion 10-5-D may be loosely secured to the recess 20-5-P to the degree that the protrusion 10-5-D is placed (received) in the recesses 10-5-D with a slight clearance therebetween.

The extension portion 20-5-E extends from a side surface of the central island portion 20-5-I in the transverse direction of the connector 20 (the Y-axis direction).

An upper end of the extension portion 20-5-E (in the Z-axis direction in FIG. 5) is located above an upper end of the central island portion 20-5-I. That is, if the central island portion 20-5-I and the extension portion 20-5-E are considered as one mass, it can be said in a certain sense that the central island portion 20-5-I has a recess 20-54-D at an upper end thereof.

Referring to FIG. 1 and FIG. 4A, with the plug connector 10 of FIG. 1 fitted into the receptacle connector 20 of FIG. 4A, the lead-in portion 10-5-P of the plug connector 10 is placed between multiple extension portions 20-5-E along the first wall 20-5-*w*1 and multiple extension portions 20-5-E along the third wall 20-5-*w*3 and partially overlaps the extension portions 20-5-E in the transverse direction of the receptacle connector 20 (the Y-axis direction).

As described above, in the receptacle connector 20, there is an extension portion 20-5-E extending from the central island portion 20-5-I toward the first wall 20-5-*w*1 of the receptacle housing 20-5. The extension portion 20-5-E is formed between each pair of signal terminals 20-3 on the first wall 20-5-*w*1 of the receptacle housing 20-5. The extension portion 20-5-E is also formed between each pair of signal terminals 20-3 on the third wall 20-5-*w*3 of the receptacle housing 20-5, as shown in FIGS. 4*a*, 4*b*, and 5.

The extension portion 20-5-E has the same width as the protrusion 20-5-P. Here, the width of the extension portion 20-5-E or the protrusion 20-5-P refers to a dimension thereof in the X-axis direction in the drawing (that is, in the longitudinal direction of the connector 20).

Figure 6:
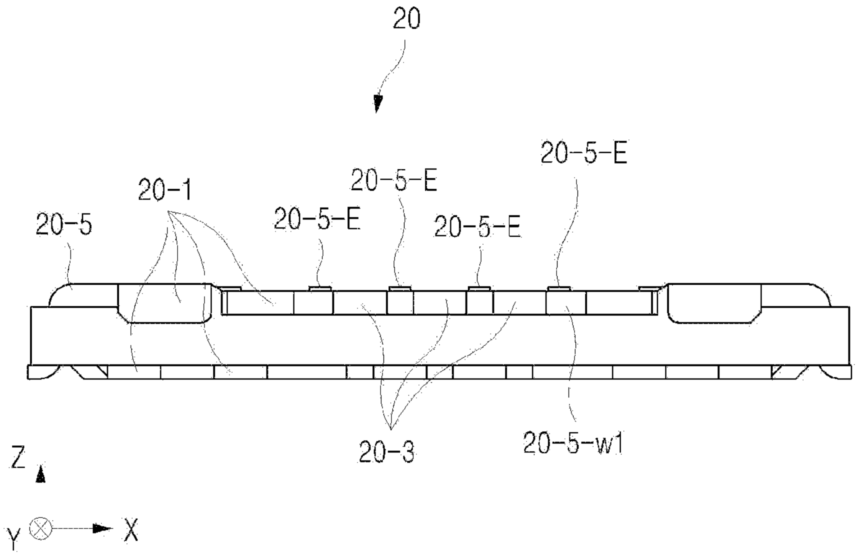
FIG. 6 is a side view of the socket connector (20) of FIG. 4A and FIG. 5.

FIG. 6 is a side view of the socket connector 20 of FIG. 4A and FIG. 5.

FIG. 6 shows a structure in which the power terminal 20-1 and the signal terminal 20-3 are coupled to the housing 20-5 (especially, the first wall 20-50*w*1).

Although not shown in FIG. 6, the protrusion 20-5-P protrudes slightly upwards from the base (see FIG. 4A and FIG. 5). In FIG. 6, a slight protrusion on the upper surface of the first wall 20-5-*w*1 is a portion of the upper end of the extension portion 20-5-E (see FIG. 4A and FIG. 5).

Figure 7:
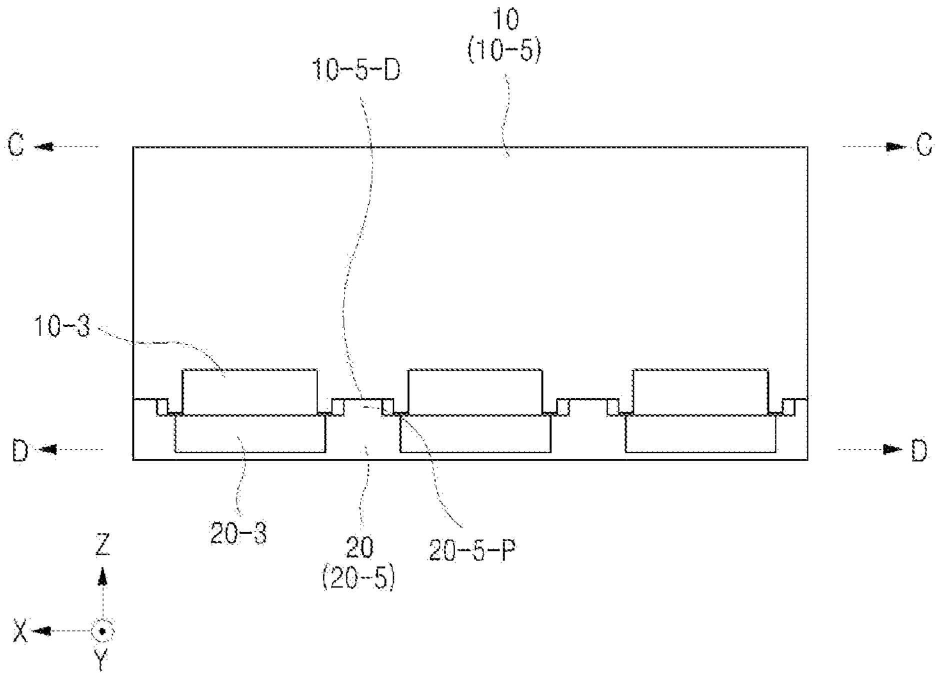
FIG. 7 is a sectional view obtained by combining section C-C of the plug connector (10) of FIG. 1 to FIG. 3 with section D-D of the socket connector 20 of FIG. 4A to FIG. 6, with the plug connector (10) connected to the socket connector (20)

FIG. 7 is a sectional view obtained by combining section C-C of the plug connector 10 (see FIG. 1 to FIG. 3) with section D-D of the socket connector 20 (see FIG. 4A to FIG. 6) with the plug connector 10 connected to the socket connector 20.

This sectional view corresponds to section C-C of FIG. 1 and FIG. 2 and section D-D of FIG. 4A and FIG. 5, with the plug connector 10 and the socket connector 20 connected to each other.

The coordinate system of FIG. 7 is matched with those of FIG. 4A to FIG. 6 (showing the socket connector 20). Accordingly, it will be understood that the socket connector 20 of FIG. 4A to FIG. 6 is connected to the plug connector 10 turned upside-down with respect to the position shown in FIG. 1 to FIG. 3.

As described above, the plug connector 10 has a recess 10-5-D formed on the first wall 10-5-*w*1 (a portion of the housing 10-5) on which the signal terminals 10-3 are disposed, whereas the socket connector 20 has a protrusion 20-5-P formed on the base 20-5 (a portion of the housing 20-5) on which the signal terminals 20-3 are disposed.

The recess 10-5-D may be described as a height difference between a molded part (the housing 10-5) and terminals 10-1, 10-3. Similarly, the protrusion 20-5-P may be described as a height difference between a molded part (the housing 20-5) and the terminals 20-1, 20-3.

FIG. 7 shows a structure in which the protrusion 20-5-P is received in the recess 10-5-D upon connection between the connectors 10, 20.

As connectors have become increasingly compact in height, the housing 10-5 or 20-5 continues to become thinner. Accordingly, in an example illustrated in FIG. 7, the height difference is set to reinforce the base of the socket connector 20 with molded ribs (that is, to somewhat increase the thickness of a corresponding portion of the housing 20-5). In this way, the connector can be made compact in height without sacrificing the strength thereof.

Although a sidewall of the recess 10-5-D and a sidewall of the protrusion 20-5-P are shown as being vertical in FIG. 7, this is merely illustrative and the present invention is not limited thereto. For example, the recess 10-5-D may have a tapered shape, as is well illustrated in FIG. 3. It will be understood that the shape of the protrusion 20-5-P may also be changed according to the tapered shape of the recess 10-5-D.

FIG. 8 is a sectional view obtained by combining section A-A of the plug connector 10 (see FIG. 1 to FIG. 3) with section B-B of the socket connector 20 (see FIG. 4A to FIG. 6) with the plug connector 10 connected to the socket connector 20.

The coordinate system of FIG. 7 is matched with those of FIG. 4A to FIG. 6 (showing the socket connector 20). Accordingly, it will be understood that the socket connector 20 of FIG. 4A to FIG. 6 is connected to the plug connector 10 turned upside-down with respect to the position shown in FIG. 1 to FIG. 3.

That is, the sectional view corresponds to section A-A in FIG. 1 and FIG. 2 and section B-B in FIG. 4A and FIG. 5, with the plug connector 10 and the socket connector 20 connected to each other.

Although an inner end of the signal terminal 20-3 will be elastically moved slightly further inward by being pushed against an inner end of the signal terminal 10-3 upon fitting of the plug connector 10 into the socket connector 20, the elastic movement of the inner end of the signal terminal 20-3 is omitted from FIG. 8 for convenience of illustration.

Considering that the sectional view of FIG. 8 is a combination of section A-A of FIG. 1 and section B-B of FIG. 4A and FIG. 4B, it can be seen that the lead-in portion 10-5-P at the center of the housing 10-5 of the plug connector 10 faces the upper surface of the central island portion 20-5-I of the socket connector 20.

Depending on the dimensions of the connectors, the lead-in portion 10-5-P may adjoin the upper surface of the central island portion 20-5-I, or may face the central island portion 20-5-I with a tiny space therebetween.

The lead-in portion 10-5-P extends longitudinally along the central island portion 20-5-I (see FIG. 4A) while facing the central island portion 20-5-I. More strictly, it can be said that the upper surface of the central island portion 20-5-I is located below the upper surface of the extension portion 20-5-E, such that a recess 20-54-D is formed by such a height difference therebetween. From this perspective, it can be said that the lead-in portion 10-5-P is received in the recess 20-54-D.

Figure 9:
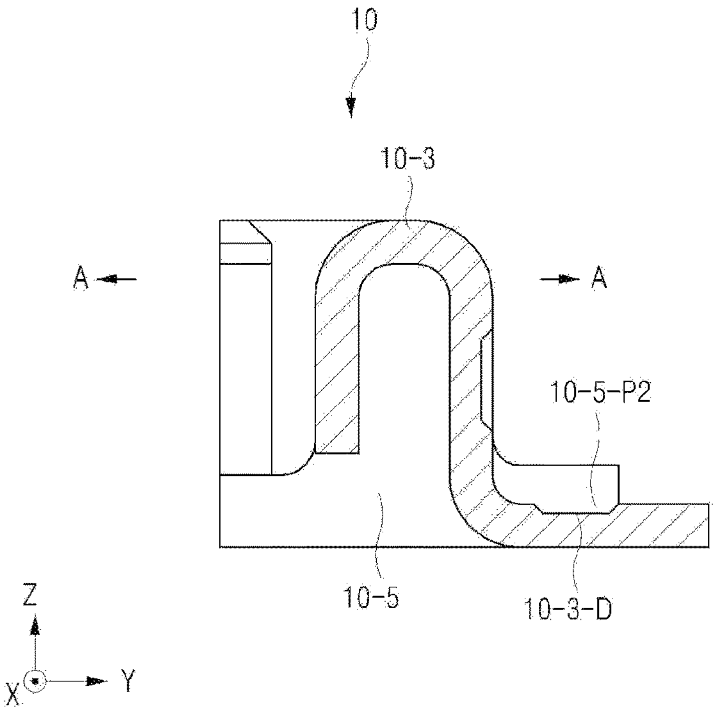
FIG. 9 is a cross-sectional view taken along line A-A of FIG. 1.

FIG. 9 is a cross-sectional view taken along line A-A of FIG. 1.

FIG. 9 shows a section of the signal terminal 10-3, in which the signal terminal 10-3 has a mounting portion (to be mounted on a substrate) at a bottom thereof.

By way of example, the mounting portion of the signal terminal 10-3 is exposed at a lower portion thereof and is partially covered by the housing 10-5 at an upper portion thereof. Here, a portion of the housing 10-5 covering the mounting portion of the signal terminal 10-3 can be very thin due to reduction in height of the connector 10.

In order to reinforce the portion of the housing 10-5 with molded ribs, an additional protrusion 10-5-P2 (also referred to a forged lead-in portion) is formed at the portion of the housing 10-5 covering the mounting portion. In addition, an additional recess 10-3-D (also referred to a forged recess) is formed at a corresponding portion of the signal terminal 10-3, such that the additional protrusion 10-5-P2 can be coupled to the additional recess 10-3-D.

With this structure, molded ribs as thick as the additional protrusion 10-5-P2 (the forged lead-in portion) can be added to the portion of the housing 10-5 covering the mounting portion, thereby complementing rigidity of the connector 10, especially, rigidity of a region around the mounting portion of the signal terminal 10-3.

Although some embodiments have been described herein in conjunction with the accompanying drawings, it should be understood that the present invention is not limited to the embodiments and may be embodied in different ways, and that various modifications, changes, alterations, and equivalent embodiments can be made by those skilled in the art without departing from the spirit and scope of the invention. Therefore, it should be understood that the foregoing embodiments are provided for illustration only and are not to be in any way construed as limiting the present invention.

LIST OF REFERENCE NUMERALS

10: Plug connector
10-1: (Plug) power terminal
10-3: (Plug) signal terminal
10-3-D: Additional recess (forged recess) of (plug) signal terminal
10-5: (Plug) housing (molded part)
10-5-P2: Additional protrusion (forged lead-in portion) of (plug) housing
10-5-*w*1: First wall
10-5-*w*2: Second wall
10-5-*w*3: Third wall
10-5-*w*4: Fourth wall
10-5-D: (Plug) recess
20: Receptacle connector (socket connector)
20-1: (Receptacle) power terminal
20-3: (Receptacle) signal terminal
20-5: (Receptacle) housing (molded part)
20-5-*w*1: First wall
20-5-*w*2: Second wall
20-5-*w*3: Third wall
20-5-*w*4: Fourth wall
20-5-I: Central island portion
20-54-D: Recess of central island portion
20-5-E: (Receptacle) extension portion
20-5-P: (Receptacle) protrusion
S: Empty space

The invention claimed is:

1. An electrical connector comprising: a plug connector mounted on a substrate and connected to a receptacle connector, wherein the plug connector comprises:

a plug housing comprising a base, a first wall protruding from an upper surface of the base, a second wall protruding from the upper surface of the base and crossing the first wall, a third wall protruding from the upper surface of the base, crossing the second wall, and facing the first wall, and a fourth wall protruding from the upper surface of the base, crossing the first wall and the third wall, and facing the second wall; and multiple plug signal terminals disposed at least on the first wall, wherein a recess is formed between the plug signal terminals to be located below an upper end of the first wall of the plug housing, wherein the recess engages with a protrusion of the receptacle connector when mated with the receptacle connector.

2. The electrical connector according to claim 1, further comprising:

the receptacle connector, wherein the receptacle connector comprises:

a receptacle housing comprising a base, a first wall protruding from an upper surface of the base, a second wall protruding from the upper surface of the base and crossing the first wall, a third wall protruding from the upper surface of the base, crossing the second wall, and facing the first wall, a fourth wall protruding from the upper surface of the base, crossing the first wall and the third wall, and facing the second wall, and a central island portion protruding the upper surface of the base and surrounded by the first to fourth walls; and multiple receptacle signal terminals disposed at least on the first wall, wherein a protrusion is formed between the receptacle signal terminals to be located above the base of the receptacle housing, wherein the protrusion engages with a recess of the plug connector when mated with the plug connector.

3. The electrical connector according to claim 2, wherein the receptacle connector further comprises an extension portion extending from the central island portion at least toward the first wall of the receptacle housing, the extension portion being formed between the multiple receptacle signal terminals arranged along the first wall of the receptacle housing.

4. The electrical connector according to claim 3, wherein, in the receptacle connector, an upper surface of the extension portion is located above an upper surface of the central island portion.

5. The electrical connector according to claim 3 or 4, wherein the plug connector further comprises a lead-in portion protruding from the upper surface of the base of the plug housing and surrounded by the first to fourth walls of the plug housing, and, upon fitting of the plug connector into the receptacle connector, the lead-in portion of the plug connector is placed between multiple extension portions arranged along the first wall of the receptacle housing and multiple extension portions arranged along the third wall of the receptacle housing and partially overlaps the extension portions in a transverse direction of the receptacle connector.

6. The electrical connector according to claim 3, wherein, in the receptacle connector, the extension portion has the same width as the protrusion.

7. The electrical connector according to claim 5, wherein the lead-in portion is longer than a region in which the plug connectors are arranged, as measured in a longitudinal direction of the plug connector.

* * * * *